Feb. 1, 1927.
G. RITTER
SAUSAGE HANGER
Filed April 16, 1926
1,616,231
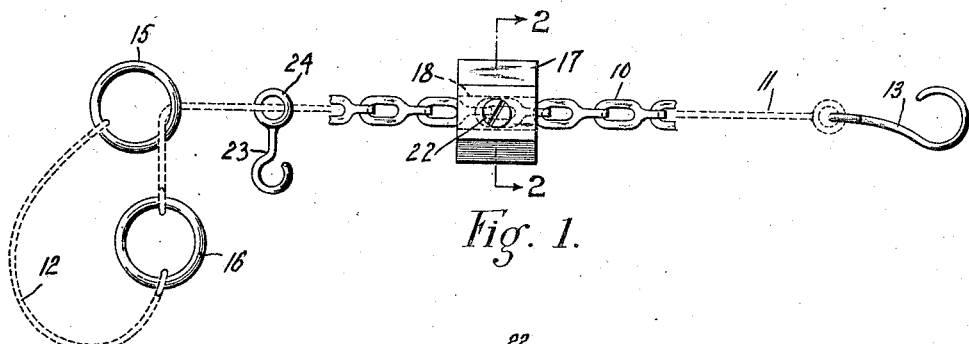
Fig. 1.
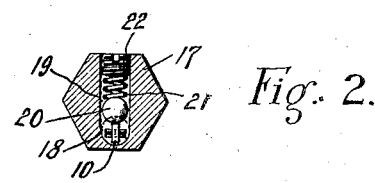
Fig. 2.
Fig. 3.
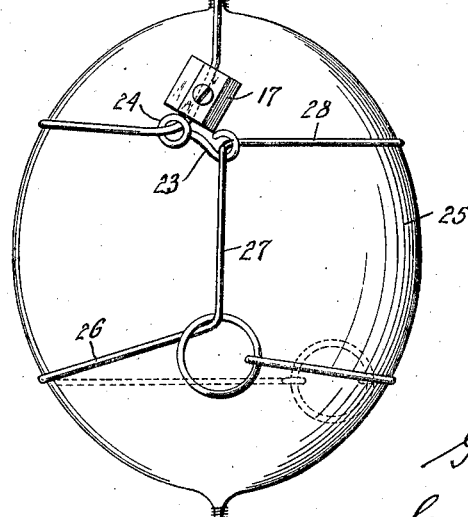
INVENTOR
G. Ritter
BY
Sigmund Herzog
ATTORNEY Patented Feb. 1, 1927.

1,616,231

UNITED STATES PATENT OFFICE.

GEORGE RITTER, OF BROOKLYN, NEW YORK, ASSIGNOR OF ONE-HALF TO ERNST MUELLER, OF RIDGEWOOD, NEW YORK.

SAUSAGE HANGER.

Application filed April 16, 1926. Serial No. 102,482.

The present invention relates to improvements in devices, whereby large and heavy sausages may be suspended from hooks in smoke-houses.

Heretofore sausages of the type mentioned were usually suspended in smoke-houses by means of cords, each sausage being handled individually. The cord is wound around and tied to the sausage, a loop being formed on the free end of the cord for engagement with a hook in the smoke-house. After the sausages have been properly smoked and removed from the smoke-house, the suspending cords are either left on the sausages or they are disengaged therefrom and thrown away, resulting thus in waste of material. The winding, tying and loop-forming operations can be performed by skilled labor only and involve considerable time.

The main object of the present invention is to provide a sausage hanger which is adapted to be used an unlimited number of times, and which may be conveniently applied to and removed from the sausages with little labor and in considerably less time than the suspending cords heretofore used.

Another object of the invention is to provide a sausage hanger of the type mentioned which is simple in construction, efficient in operation, durable in use and which is capable of manufacture on a commercial scale.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 1 is an elevation of a sausage hanger constructed in accordance with the present invention; Fig. 2 is a section taken on line 2—2 of Fig. 1; and Fig. 3 illustrates the method of applying the same to a sausage.

The hanger comprises a metal chain 10 of any suitable construction and length. This chain is, preferably, made of two sections, denoted by the numerals 11 and 12, the section 12 being considerably shorter than the section 11. To one end of the section 11 is fixed a hook 13, for engagement with a hook 14 in the smoke house. The other end of the chain section 11 is extended through a ring 15 and attached to a ring 16, the rings 15 and 16 being connected by the chain section 12. In this manner a loop is formed in that end of the chain adjacent which the rings 15 and 16 are disposed. The purpose of this loop will be hereinafter explained. On the chain section 11 is slidably arranged a block 17. This block is, preferably, made of metal and may be of any suitable configuration. It is provided eccentrically with a bore 18, through which the chain is extended. At right angles to the bore 18 is provided in the block a bore 19, in which is loosely mounted a small ball 20, held by means of a spring 21, in the last-mentioned bore, in engagement with the links of the chain. The spring and ball are confined in the bore 19 by a plug 22. This plug serves also to hold the spring 21 under tension, forcing the ball 20 against the chain and thus fixing the position of the block 17 on said chain against accidental movement. Between the ring 15 and the block 17 is shiftably mounted on the chain section 11 a clip 23, preferably, in the form of a hook having an eye 24, the chain extending through the said eye.

In use, the loop above referred to is enlarged by taking hold of the two rings 15 and 16 and drawing the same apart. One end of the sausage 25 is placed into the loop, denoted in Fig. 3 of the drawings by the numeral 26, and the loop drawn taut on the sausage. The chain is then extended longitudinally on the sausage, as shown at 27 in Fig. 3, and then around the sausage as shown at 28. The hook-end of the clip 23 is then engaged with the chain at the juncture of the sections 27 and 28, and the block 17 shifted into engagement with the clip, whereby the chain is prevented from becoming loose when the sausage is suspended from the hook 14 in the smoke house.

It is to be noted that the block may be forcibly moved on the chain by the operator, the ball 20 riding over the links of the chain, the spring 21 alternately expanding and contracting during the shifting movement.

As appears from Fig. 1 of the drawings the rings 15 and 16 are of the same size, so that a loop will always be maintained at the end of the chain. This saves labor in applying the hanger to a sausage.

What I claim is:—

1. A sausage hanger comprising a chain, a ring on one end of said chain, a suspending means on the other end of said chain, a block slidably disposed on said chain, means on said block for preventing accidental movement thereof on said chain but permitting the same to be forcibly shifted to any desired position thereon, and a clip shiftable on said chain between said ring and said block.

2. A sausage hanger comprising a chain having an expansible loop formed at one of its ends, a suspending means at the other end of said chain, a block slidably disposed on said chain, means on said block for preventing accidental movement thereof on said chain but permitting the same to be forcibly shifted to any desired position thereon, and a clip shiftable on said chain between said loop and said block.

3. A sausage hanger comprising a chain, a ring on one end of said chain, a suspending means on the other end of said chain, a block slidably disposed on said chain, said block being provided with a bore, a spring-pressed ball in said bore engaging said chain to prevent accidental movement of said block on said chain but permitting said block to be forcibly shifted to any desired position thereon, and a clip shiftable on said chain between said ring and said block.

4. A sausage hanger comprising a chain having an expansible loop formed at one of its ends, a suspending means at the other end of said chain, a block slidably disposed on said chain, said block being provided with a bore, a spring-pressed ball in said bore engaging said chain to prevent accidental movement of said block on said chain but permitting said block to be forcibly shifted to any desired position thereon, and a clip shiftable on said chain between said loop and said block.

Signed at New York, in the county of New York, and State of New York, this 2nd day of April, A. D. 1926.

GEORGE RITTER.